US012215009B1

(12) United States Patent
Martin et al.

(10) Patent No.: US 12,215,009 B1
(45) Date of Patent: Feb. 4, 2025

(54) AUTONOMOUS MOBILE ROBOTS HAVING VERTICAL HEIGHT EXTENSION SYSTEMS FOR AUGMENTED VISIBILITY

(71) Applicant: Amazon Technologies, Inc., Seattle, WA (US)

(72) Inventors: Tim Martin, Andover, MA (US); Dincer Bozkaya, Andover, MA (US); Matthew Anthony Brady, Boston, MA (US); William Clem, Seattle, WA (US); Timothy G. Dietz, Reading, MA (US); Gabriel Hebert, Wakefield, MA (US); Dragan Pajevic, Arlington, MA (US)

(73) Assignee: Amazon Technologies, Inc., Seattle, WA (US)

( * ) Notice: Subject to any disclaimer, the term of this patent is extended or adjusted under 35 U.S.C. 154(b) by 300 days.

(21) Appl. No.: 17/742,818

(22) Filed: May 12, 2022

(51) Int. Cl.

| | |
|---|---|
| ***B66F 9/06*** | (2006.01) |
| ***B66F 9/065*** | (2006.01) |
| ***B66F 9/075*** | (2006.01) |
| ***B66F 9/18*** | (2006.01) |

(52) U.S. Cl.
CPC .............. *B66F 9/063* (2013.01); *B66F 9/065* (2013.01); *B66F 9/0755* (2013.01); *B66F 9/182* (2013.01)

(58) Field of Classification Search
CPC .. B66F 9/065; B66F 9/063; G09F 2017/0075; G09F 2017/0083
See application file for complete search history.

(56) References Cited

U.S. PATENT DOCUMENTS

| | | | | |
|---|---|---|---|---|
| 9,073,736 | B1 * | 7/2015 | Hussain | G05D 1/667 |
| 9,395,217 | B1 * | 7/2016 | Gaor | G09F 17/00 |
| 11,019,466 | B1 * | 5/2021 | Johnson | B60R 11/02 |
| 2017/0186347 | A1 * | 6/2017 | Sorensen | G09F 17/00 |
| 2020/0372843 | A1 * | 11/2020 | Short | G09F 17/00 |
| 2021/0198037 | A1 * | 7/2021 | Sabhnani | B65G 1/10 |
| 2022/0315332 | A1 * | 10/2022 | Goel | B65G 1/0471 |
| 2022/0332505 | A1 * | 10/2022 | Min | B65G 1/1373 |
| 2022/0371424 | A1 * | 11/2022 | Nagel | B66F 9/063 |

(Continued)

OTHER PUBLICATIONS

Instagram post titled "How to keep track of your corgi in the office if he wanders off", posted Mar. 2, 2018 by user "@ chompersthecorgi". Retrieved from Internet: https://www.instagram.com/p/Bf0xQllniKs/?igsh=MWJsNjQ4bzJnMTFnbw%3D%3D.*

(Continued)

*Primary Examiner* — Kaitlin S Joerger
(74) *Attorney, Agent, or Firm* — Athorus, PLLC

(57) ABSTRACT

Autonomous mobile robots having vertical height extension systems for augmented visibility may include a drive mechanism, a lift mechanism, and a vertical height extension including an extension mechanism and a vertical indicator. The vertical height extension may be actively or passively actuated between lowered and raised positions. In addition, the vertical height extension may include a breakaway feature to prevent raising or cause lowering of the vertical indicator in the presence of a payload above the robot. Further, the vertical height extension may include various actuators, emitters, or elements to communicate various attributes of the robot to human associates in proximity, thereby promoting safe, collaborative operations.

18 Claims, 12 Drawing Sheets

(56) References Cited

U.S. PATENT DOCUMENTS

| | | | | |
|---|---|---|---|---|
| 2023/0154363 | A1* | 5/2023 | Tuttle | G09F 17/00<br>116/173 |
| 2023/0202813 | A1* | 6/2023 | Mainz | B66F 9/065<br>414/373 |
| 2023/0348248 | A1* | 11/2023 | Yamamoto | G05D 1/0274 |
| 2023/0381955 | A1* | 11/2023 | Bacon | G05B 19/41895 |

OTHER PUBLICATIONS

Instagram Account Page (Year: 2018).*

* cited by examiner

AUTONOMOUS MOBILE ROBOTS HAVING VERTICAL HEIGHT EXTENSION SYSTEMS FOR AUGMENTED VISIBILITY

BACKGROUND

Many companies may store, package, and ship items and/or groups of items from material handling facilities. For example, many companies may store items in a material handling facility and ship items to various destinations (e.g., customers, stores) from the material handling facility. In addition, various automated, autonomous, or robotic vehicles, machinery, or systems may facilitate various material handling processes and tasks within a facility, often in cooperation with human associates. Accordingly, there is a need for systems and methods to ensure safe, collaborative operations of both autonomous mobile robots and human associates within a material handling facility.

DETAILED DESCRIPTION

Figure 1A:
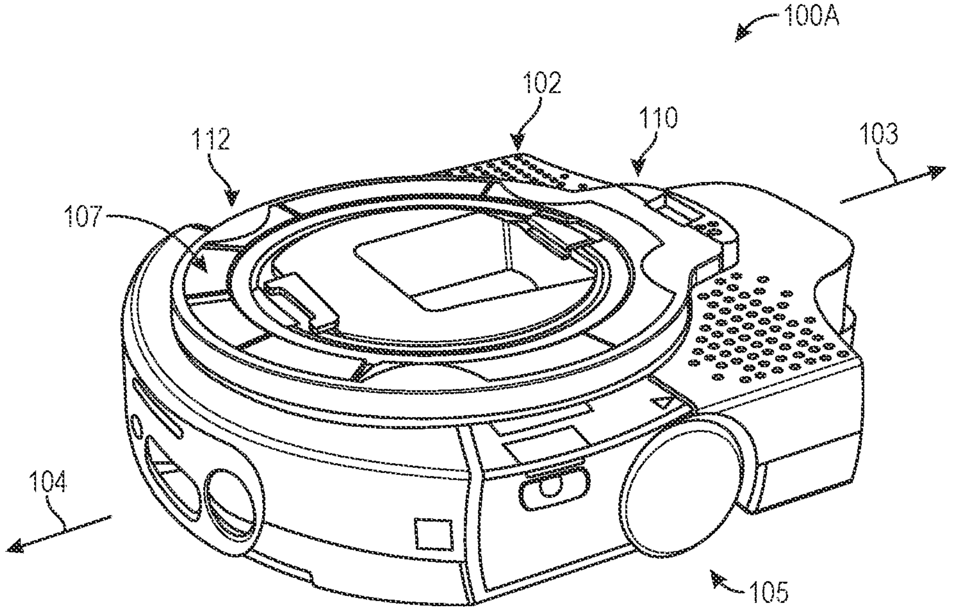
FIG. 1A is a schematic rear perspective view diagram of an example autonomous mobile robot having a vertical height extension system in a lowered position, in accordance with implementations of the present disclosure.

As is set forth in greater detail below, implementations of the present disclosure are directed to autonomous mobile robots having vertical height extension systems for augmented visibility and associated methods of operating such vertical height extension systems.

In example embodiments, an autonomous mobile robot may comprise a body, a drive mechanism, and a lift mechanism, e.g., to engage, lift, and move a payload such as a cart. The autonomous mobile robot may generally have a low profile, or reduced vertical height, in order to drive, navigate, or maneuver under payloads and to engage, lift, and move such payloads. As further described herein, the autonomous mobile robot may also comprise a vertical height extension system to increase a vertical height and visibility associated with the autonomous mobile robot, thereby improving safe and collaboration operations between autonomous mobile robots and human associates within various types of facilities.

In example embodiments, the vertical height extension system may move or be moved between a lowered position, e.g., substantially flush with an upper surface of the autonomous mobile robot, and a raised position, e.g., pivoted or moved vertically to increase a vertical height of the autonomous mobile robot. In some example embodiments, the vertical height extension system may be passively operated or actuated responsive to actuation of the lift mechanism. In other example embodiments, the vertical height extension system may comprise one or more actuators to selectively operate or actuate the vertical height extension system.

In further example embodiments, the vertical height extension system may comprise a vertical indicator, such as a ring, halo, square, other polygon, mast, flag, or other type, size, or shape of vertical indicator. In addition, the vertical height extension system may comprise an extension mechanism configured to cause movement of the vertical indicator between the lowered position and the raised position. Further, the extension mechanism of the vertical height extension system may comprise a breakaway component or element to couple to or decouple from the vertical indicator of the vertical height extension system. For example, responsive to engagement by the lift mechanism with a payload positioned above the autonomous mobile robot, the breakaway component may disconnect or decouple from the vertical indicator to avoid collision, interference, or damage between the vertical indicator and the overhead payload. In addition, responsive to disengagement by the lift mechanism from a payload positioned above the autonomous mobile robot, the breakaway component may reconnect or couple to the vertical indicator to enable movement of the vertical indicator to the raised position in subsequent operations that are unobstructed by an overhead payload.

In additional example embodiments, the vertical height extension system, e.g., the vertical indicator, may comprise visual emitters, such as lights, light emitting diodes (LEDs), or other light sources or emitters, and/or audio emitters, such as speakers, piezoelectric elements, or other audio sources or emitters. In addition, one or more portions of the vertical height extension system may include movable parts and associated actuators. Then, upon movement of the vertical indicator to the raised position, one or more of the visual emitters, audio emitters, and/or actuators may be operated or actuated to indicate or communicate various attributes associated with the autonomous mobile robot. For example, the various attributes may comprise size, dimensions, position, orientation, direction of motion or travel, speed, acceleration, intent, task, destination, operational status, and/or various other attributes of the autonomous mobile robot.

As described herein, in addition to increasing vertical height and visibility of the autonomous mobile robot, the vertical height extension system may communicate various attributes of the autonomous mobile robot to human associates to further facilitate safe and collaborative operations within various types of facilities.

Figure 1B:
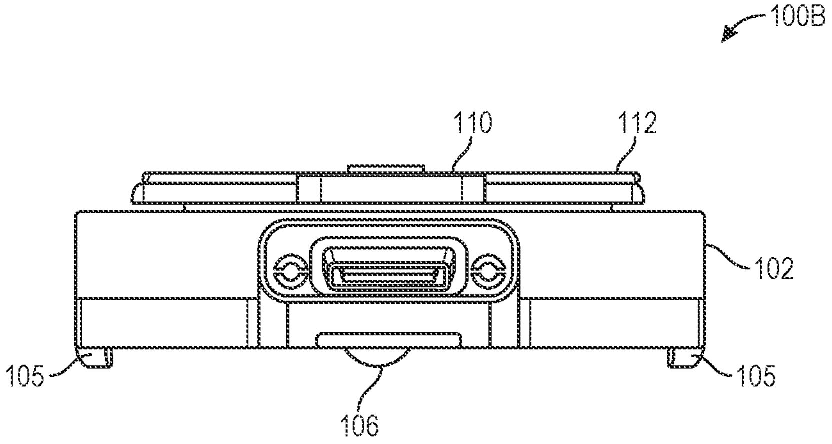
FIG. 1B is a schematic front view diagram of an example autonomous mobile robot having a vertical height extension system in a lowered position, in accordance with implementations of the present disclosure.

FIG. 1A is a schematic rear perspective view diagram 100A of an example autonomous mobile robot having a vertical height extension system in a lowered position, in accordance with implementations of the present disclosure. FIG. 1B is a schematic front view diagram 100B of an example autonomous mobile robot having a vertical height extension system in a lowered position, in accordance with implementations of the present disclosure.

As shown in FIGS. 1A and 1B, the example autonomous mobile robot (AMR) may include a body 102, one or more drive mechanisms 105, one or more rollers, casters, or idlers 106, a lift mechanism 107, and a vertical height extension system (also referred to herein as vertical height extension) including an extension mechanism 110 and a vertical indicator 112. For example, the body 102 of the AMR may house, retain, or receive various components of the AMR, such as processors, memories, controllers, batteries or power supplies, sensors, actuators, communication components, and/or various other components. Further details of various components of the example AMR are described herein at least with respect to FIG. 10.

In example embodiments, the AMR may drive, navigate, or maneuver within a facility using the one or more drive mechanisms 105, e.g., one or more motors or actuators and associated wheels or rollers, to move the AMR in a forward direction 103 or a rearward direction 104. In addition, the drive mechanisms 105 may comprise differential drive mechanisms such that a respective drive mechanism on either side of the AMR may be operated substantially independently to rotate in forward or rearward directions and at various rotational rates or speeds. In this manner, the AMR may move forward or rearward in substantially straight lines or along various arcs, and/or the AMR may rotate or spin left or right substantially in position.

Figure 2A:
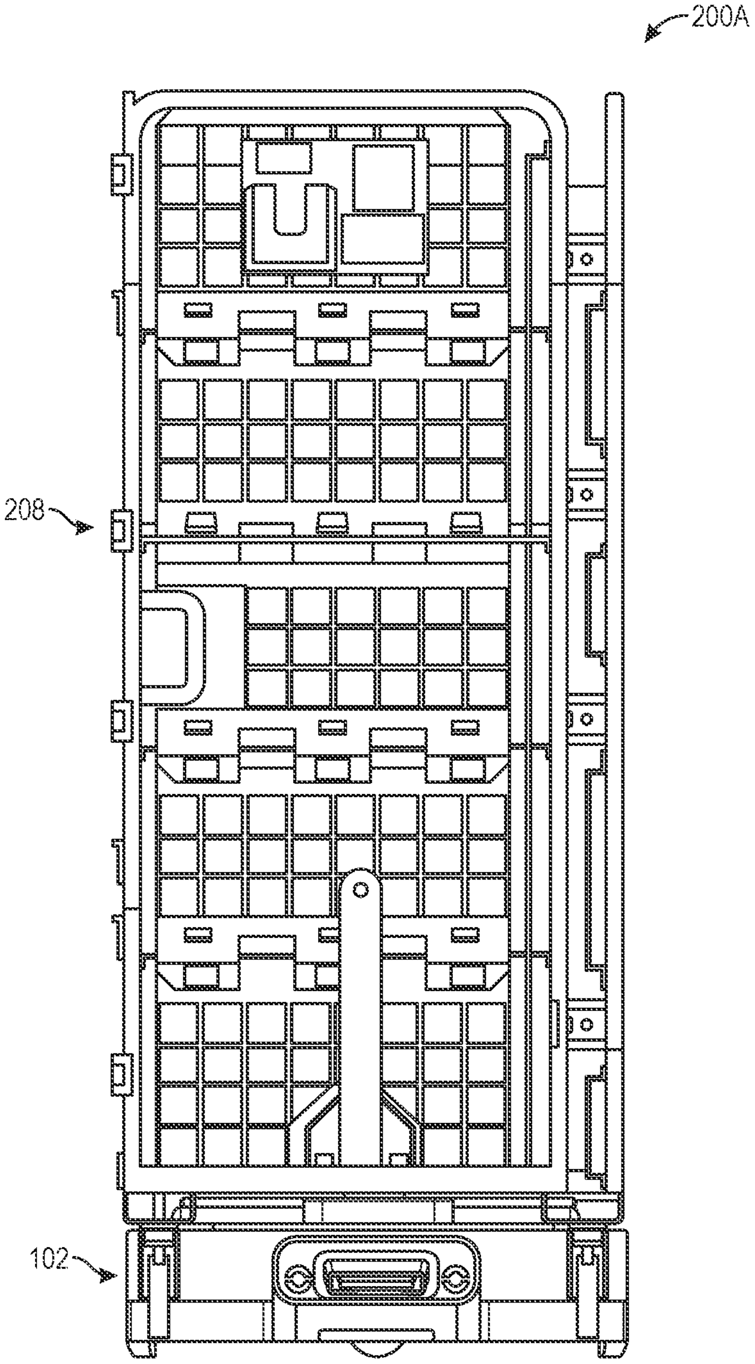
FIG. 2A is a schematic front view diagram of an example autonomous mobile robot engaged with a cart, in accordance with implementations of the present disclosure.
Figure 2B:
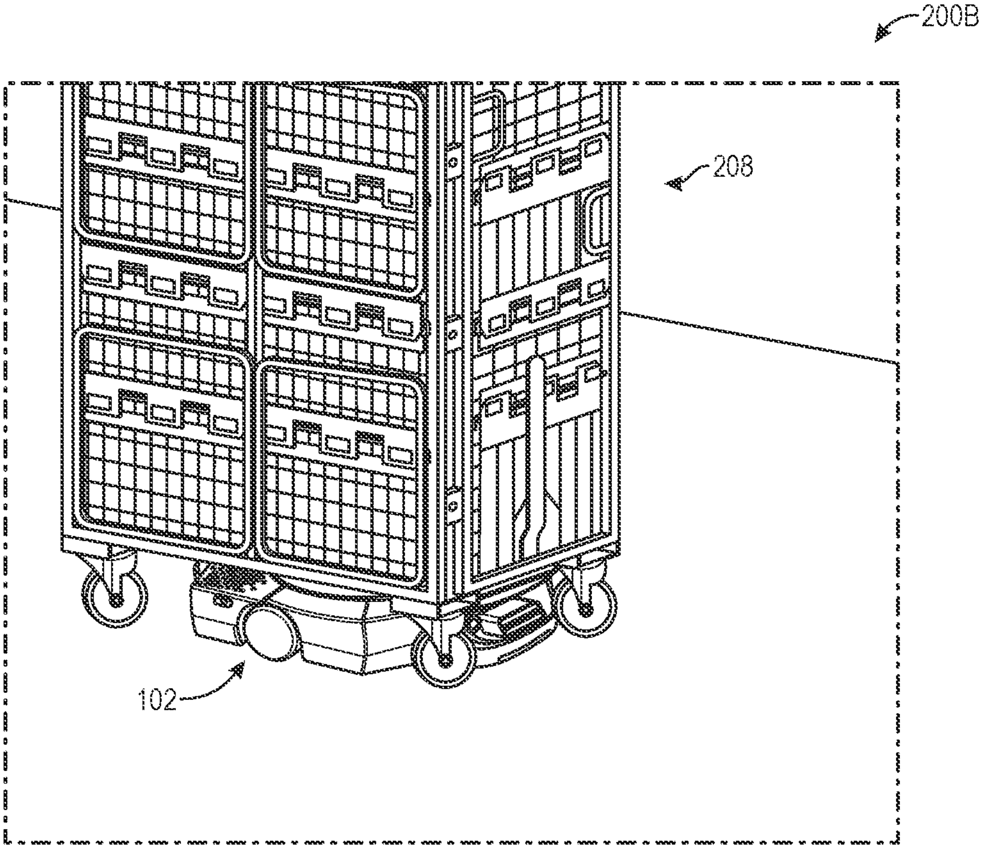
FIG. 2B is a schematic side perspective view diagram of an example autonomous mobile robot engaged with a cart, in accordance with implementations of the present disclosure.

FIG. 2A is a schematic front view diagram 200A of an example autonomous mobile robot engaged with a cart, in accordance with implementations of the present disclosure. FIG. 2B is a schematic side perspective view diagram 200B of an example autonomous mobile robot engaged with a cart, in accordance with implementations of the present disclosure.

For example, the AMR may navigate within a facility and under various payloads 208 to engage, lift, and move the payloads 208 within the facility. The various payloads 208 may comprise carts, shelves, inventory pods, pallets, crates, bins, boxes, or other types of payloads. In the example of FIGS. 2A and 2B, the payload 208 is illustrated as a cart having a plurality of sides, levels, sections, and/or compartments to receive and retain various items or objects, and a plurality of wheels or rollers to facilitate movement of the cart within a facility.

In example embodiments, the lift mechanism 107 of the AMR may be operated or actuated to move between a retracted position and a lifting position. In the example shown in FIGS. 1A and 1B, the lift mechanism 107 may comprise a substantially circular lift plate that is moved between the retracted position and the lifting position via one or more actuators within the body 102. In the retracted position, the lift mechanism 107 may be lowered or retracted vertically downward toward the body 102 to disengage from a payload 208 and reduce a height of the AMR to enable navigation under payloads. In the lifting position, the lift mechanism 107 may be raised or lifted vertically upward away from the body 102 to engage, lift, and move a payload 208 that is positioned overhead or above the AMR.

As described herein, the AMR may navigate within a facility and operate in collaboration with various other AMRs, of similar or different types, and/or with human associates. Because the AMR may be sized or shaped to navigate under and engage, lift, and move payloads, the AMR may generally have a low profile or low vertical height, regardless of whether the lift mechanism 107 is positioned in the retracted position or the lifting position.

Furthermore, as shown in FIGS. 1A and 1B, the vertical height extension may be positioned in a lowered position that is substantially flush with an upper surface of the body 102 and/or lift mechanism 107 of the AMR. In addition, in the lowered position, the vertical indicator 112 and extension mechanism 110 of the vertical height extension may nest within or be positioned relative to portions of the body 102 and/or lift mechanism 107 such that the vertical indicator 112 and extension mechanism 110 are not the most vertically prominent portions of the AMR. As a result, in the lowered position, the vertical height extension may not increase a vertical height of the AMR, such that the AMR is able to maintain a low profile or low vertical height to navigate under and engage, lift, and move payloads. Moreover, any loads applied by payloads positioned above the AMR may generally be received by portions of the body 102 and/or lift mechanism 107, rather than portions of the vertical height extension.

Figure 3A:
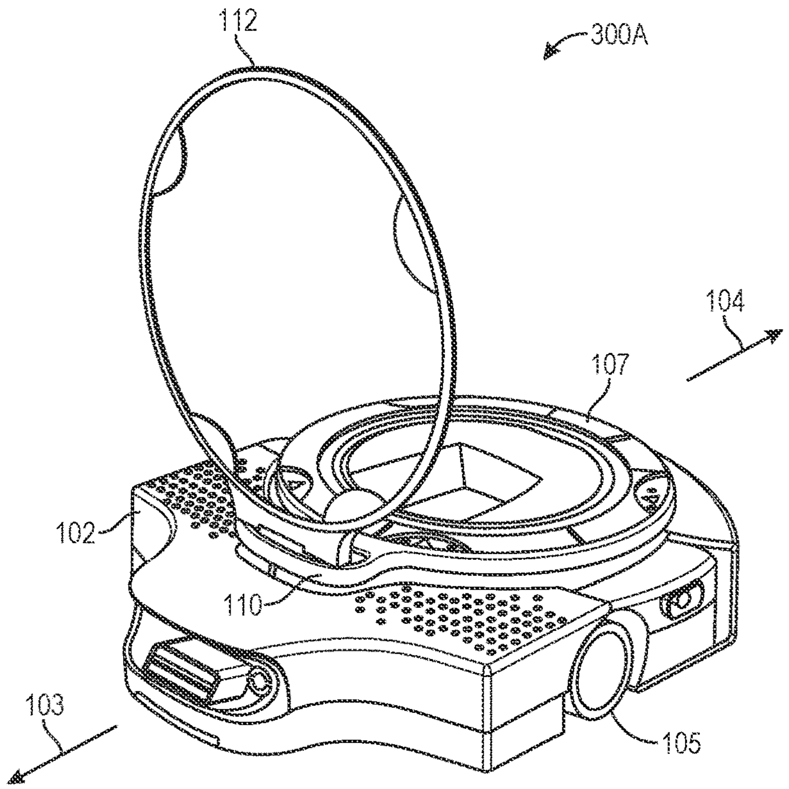
FIG. 3A is a schematic front perspective view diagram of an example autonomous mobile robot having a vertical height extension system in a raised position, in accordance with implementations of the present disclosure.
Figure 3B:
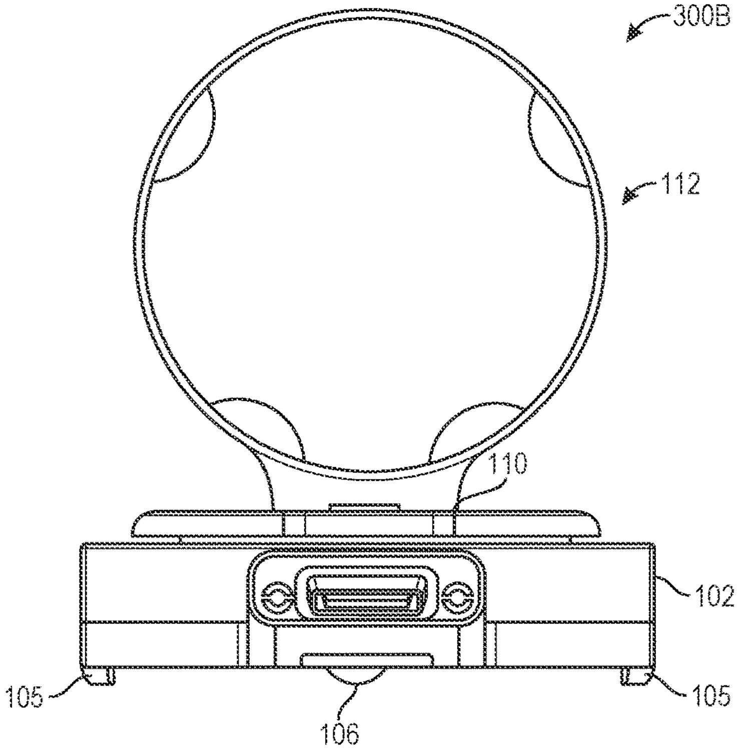
FIG. 3B is a schematic front view diagram of an example autonomous mobile robot having a vertical height extension system in a raised position, in accordance with implementations of the present disclosure.

FIG. 3A is a schematic front perspective view diagram 300A of an example autonomous mobile robot having a vertical height extension system in a raised position, in accordance with implementations of the present disclosure. FIG. 3B is a schematic front view diagram 300B of an example autonomous mobile robot having a vertical height extension system in a raised position, in accordance with implementations of the present disclosure.

As shown in FIGS. 3A and 3B, the vertical height extension system may be positioned in a raised position that increases a vertical height and visibility of the AMR. In the raised position, the vertical height extension system may substantially increase the vertical height of the AMR, such that the AMR may operate safely and collaboratively with human associates within a facility, particularly when the AMR is not engaged with and/or moving a payload.

For example, the extension mechanism 110 of the vertical height extension may move, rotate, or pivot the vertical indicator 112 between a lowered position, as shown in FIGS. 1A and 1B, and a raised position, as shown in FIGS. 3A and 3B. In the raised position, the vertical indicator 112 may be positioned within a substantially vertical plane above the AMR, and/or the vertical indicator 112 may be positioned at other angles relative to the AMR and/or a ground surface.

In example embodiments, the vertical indicator 112 may comprise various types, sizes, or shapes, such as a ring, circle, oval, halo, triangle, square, rectangle, other polygon, beam, mast, flag, tube, balloon, air bag, or other type, size, or shape of vertical indicator. In addition, the vertical indicator 112 may be formed of various materials, such as metals, plastics, composites, polycarbonates, other materials, and/or combinations thereof. Further, the vertical indicator 112, and/or various portions or sections thereof, may be formed of or include materials, surface textures, or surface features to increase visibility of the vertical indicator 112, e.g., by selecting, designing, and/or incorporating various reflective, refractive, diffractive, dispersion, absorption, or other attributes or characteristics of the vertical indicator 112 with respect to light. Such attributes or characteristics of materials, surface texture, or surface features of the vertical indicator 112 may comprise passive visibility enhancements or improvements as no actuation or activation is needed, other than the presence of ambient light, external light sources, and/or onboard light sources, to leverage the passive visibility features. Various other aspects of portions of the vertical indicator 112 are described herein at least with respect to FIG. 8.

In some example embodiments, the extension mechanism 110 may comprise an actuator configured to move the vertical indicator 112 between the lowered position and the raised position. For example, the actuator may comprise a servo, solenoid, motor, linear actuator, rotary actuator, pneumatic actuator, telescoping actuator or mechanism, or other types of motors or actuators. In such examples, a control system of the AMR may instruct or command operation, via an actuator, of the extension mechanism 110 to move the vertical indicator 112 between the lowered position and the raised position.

In additional example embodiments, the extension mechanism 110 may comprise an actuator or motor that operates as a fan or pump to inflate, deflate, expand, and/or retract the vertical indicator 112 between the lowered position and the raised position. For example, the actuator may comprise a fan, an air pump, other type of fluid pump, a releasable gas or fluid cartridge, a battery- or capacitor-driven fan or pump, or other types of fans or pumps. In such examples, the vertical indicator 112 may comprise an expandable and/or retractable material, such as an inflatable tube, balloon, air bag, or other similar flexible, expandable, and/or collapsible material or structure. Further, a control system of the AMR may instruct or command operation, via an actuator such as a fan or pump, of the extension mechanism 110 to move the vertical indicator 112 between the lowered position and the raised position.

In other example embodiments, the extension mechanism 110 may be passively actuated responsive to movement of the lift mechanism 107. For example, responsive to movement of the lift mechanism 107 to the lifting position, the extension mechanism 110 may be caused to move, rotate, or pivot the vertical indicator 112 to the raised position. Likewise, responsive to movement of the lift mechanism 107 to the retracted position, the extension mechanism 110 may be caused to move, rotate, or pivot the vertical indicator 112 to the lowered position. Further details of an example passively actuated vertical height extension system are described herein at least with respect to FIGS. 4, 5A, and 5B.

In further example embodiments, the extension mechanism 110, whether actively or passively actuated, may comprise a breakaway component or feature. For example, the breakaway component may decouple or disconnect the vertical indicator 112 from the extension mechanism 110 to prevent collision, interference, or damage between the vertical indicator 112 and an overhead payload that is engaged and lifted by the lift mechanism 107. The breakaway component may comprise various types of components or features, such as a magnet, an electromagnet, a bistable spring, an elastic coupling, a snap fastener, a frictional engagement feature, a hook and loop fastener, or other types of breakaway components or features. In some example embodiments, the breakaway component or feature may comprise releasable and/or reattachable fasteners, elements, components, or features.

In example embodiments of a vertical height extension including a breakaway component or feature, if a payload is positioned over the AMR when the extension mechanism 110 causes movement of the vertical indicator 112 toward the raised position, the breakaway component may decouple or disconnect the vertical indicator 112 from the extension mechanism 110, such that the vertical indicator 112 may remain substantially in the lowered position and avoid collision or damage with the overhead payload. Thereafter, when the extension mechanism 110 causes movement of the vertical indicator 112 toward the lowered position, the breakaway component may couple or reconnect the vertical indicator 112 to the extension mechanism 110, such that the vertical indicator 112 may subsequently be moved between the lowered and raised positions in the absence of an overhead payload. Further details of movement of the vertical height extension between lowered and raised positions, in the absence or presence of an overhead payload, are described herein at least with respect to FIGS. 6A-7F.

Although FIGS. 1A-3B illustrate particular types, sizes, shapes, configurations, or arrangements of an AMR and a payload, other example embodiments may include other types, sizes, shapes, configurations, or arrangements of an AMR or a payload, or components thereof. For example, the AMR may have other sizes or shapes, the AMR may have other types of drive mechanisms, the AMR may have other types of lift mechanisms, the vertical height extension system may have other sizes, shapes, configurations, or arrangements, the vertical indicator may have other types, sizes, or shapes, the extension mechanism may be actively or passively operated using or responsive to various actuation mechanisms, the payload may have various types, sizes, shapes, configurations, or arrangements, and/or various other modifications may be made to portions of the AMR and/or payload.

Figure 4:
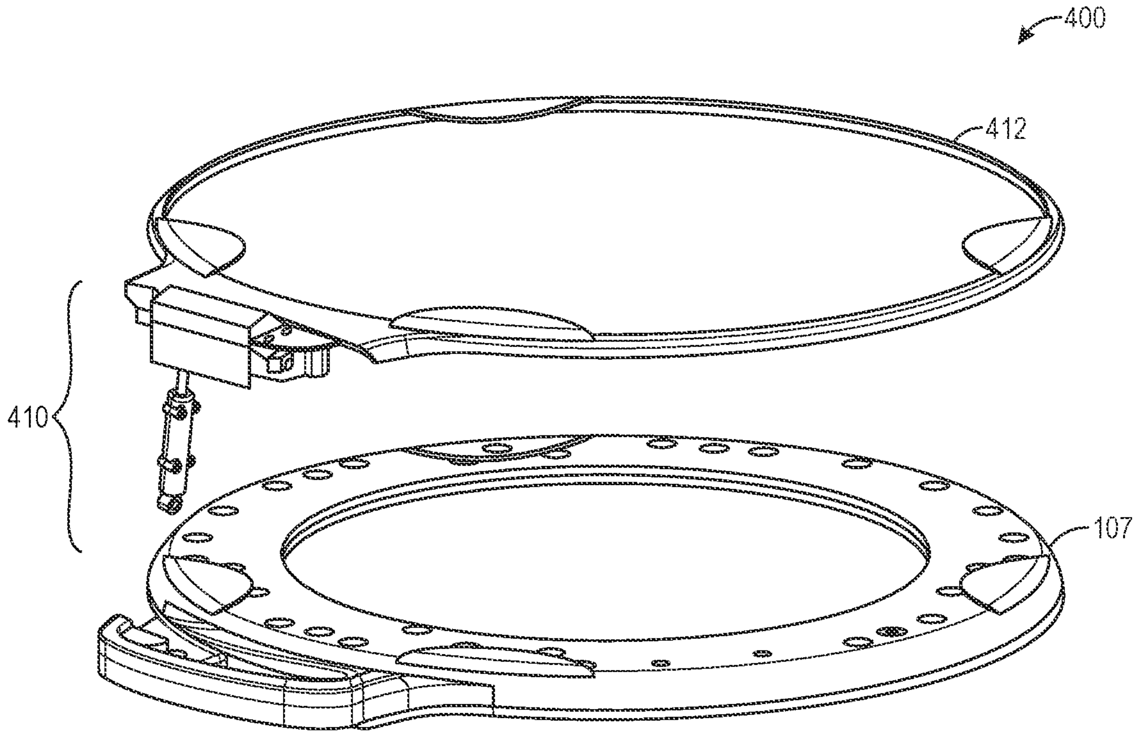
FIG. 4 is a schematic, partially exploded, perspective view diagram of an example vertical height extension system, in accordance with implementations of the present disclosure.

FIG. 4 is a schematic, partially exploded, perspective view diagram 400 of an example vertical height extension system, in accordance with implementations of the present disclosure.

As shown in FIG. 4, the example vertical height extension system including an extension mechanism 410 and a vertical indicator 412 may be formed, sized, and shaped to nest within or be positioned relative to portions of a body and/or lift mechanism 107 of an AMR. For example, the vertical indicator 412 may substantially form a ring or halo that moves between a lowered position, e.g., substantially flush and nested within portions of the lift mechanism 107, and a raised position, e.g., moved, rotated, or pivoted to a vertical orientation or other raised position, orientation, or angle.

The extension mechanism 410 may be coupled between a portion of a body of an AMR, and a portion of the vertical indicator 412, in order to cause movement, rotation, or pivoting of the vertical indicator 412 between the lowered and raised positions. In the example embodiment illustrated in FIG. 4 and as further described in detail with respect to FIGS. 5A and 5B, the extension mechanism 410 may be passively actuated responsive to movement of the lift mechanism 107 between retracted and lifting positions.

As a result, responsive to movement of the lift mechanism 107 to the lifting position, the extension mechanism 410 may cause corresponding movement or pivoting of the vertical indicator 412 to the raised position. Likewise, responsive to movement of the lift mechanism 107 to the retracted position, the extension mechanism 410 may cause corresponding movement or pivoting of the vertical indicator 412 to the lowered position.

In other example embodiments, the vertical height extension may comprise an actuator coupled to the vertical indicator 412 to move or pivot the vertical indicator 412 between the lowered and raised positions, as well as one or more other positions between the lowered and raised position or any other positions different from the lowered position. For example, the actuator may comprise a servo, solenoid, motor, linear actuator, pneumatic actuator, or other types of motors or actuators. In such examples, the actuator, in place of or in combination with the extension mechanism 410, may cause movement or pivoting of the vertical indicator 112 between the lowered position and the raised position, and/or any other positions, orientations, or angles.

Figure 5B:
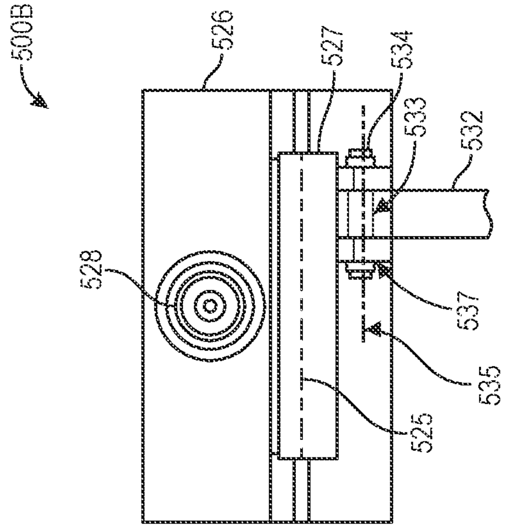
FIG. 5B is a schematic rear view diagram of a portion of an example vertical height extension system, in accordance with implementations of the present disclosure.
Figure 5A:
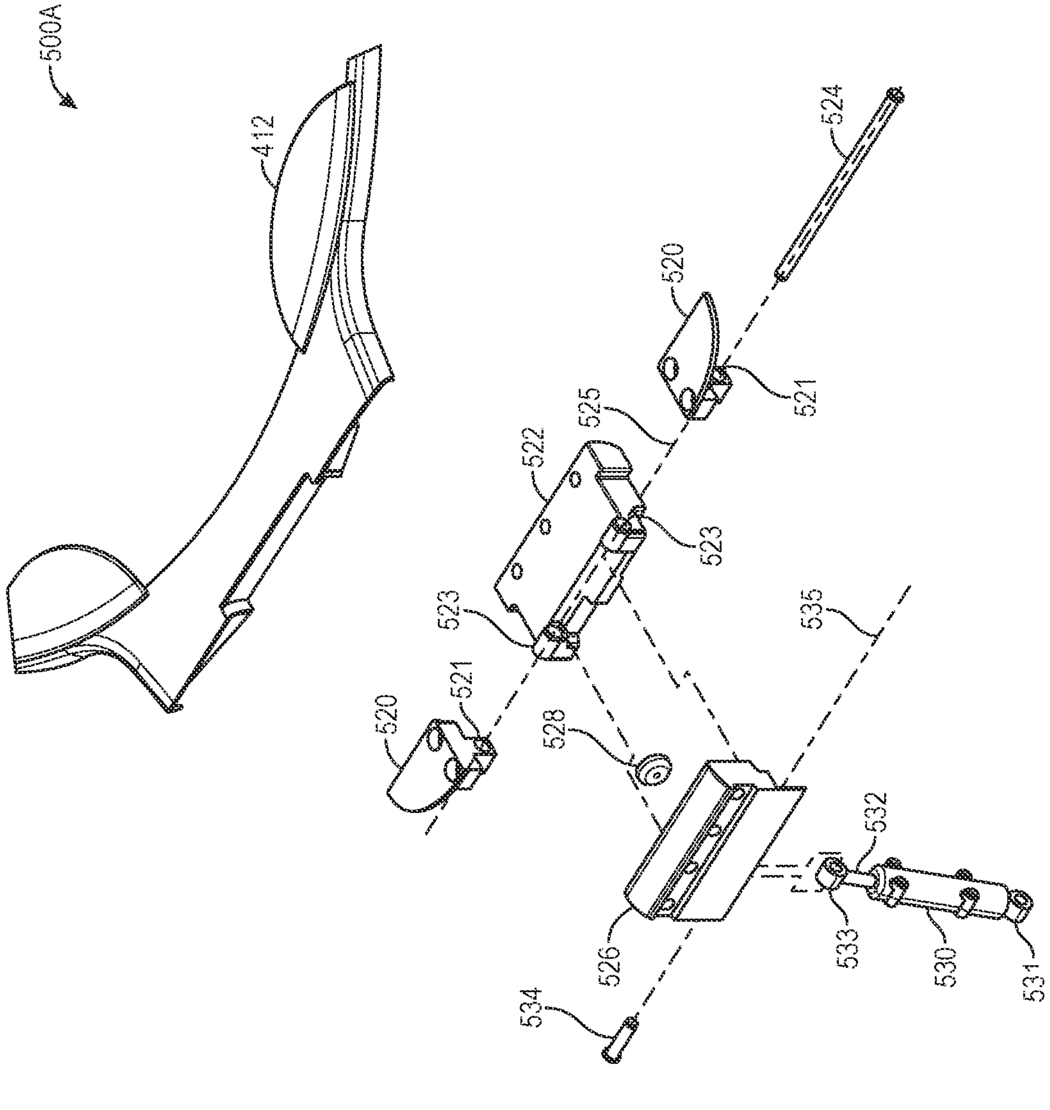
FIG. 5A is a schematic, exploded, perspective view diagram of an example vertical height extension system, in accordance with implementations of the present disclosure.

FIG. 5A is a schematic, exploded, perspective view diagram 500A of an example vertical height extension system, in accordance with implementations of the present disclosure. FIG. 5B is a schematic rear view diagram 500B of a portion of an example vertical height extension system, in accordance with implementations of the present disclosure.

As shown in FIGS. 5A and 5B, the example vertical height extension system may include an extension mechanism and a vertical indicator 412. The extension mechanism, which may comprise the extension mechanisms 110, 410 described herein, may include bearing blocks 520, a follower block 522, a first shaft 524, a leader block 526, a breakaway component 528, a spring-loaded mechanism 530, and a second shaft 534, as well as various fasteners, bearings, connectors, or other attachment elements between and among the various components.

The bearing blocks 520 may be fixedly coupled to a lift plate, upper surface, or other portion of the lift mechanism 107, e.g., using fasteners, adhesives or other methods. The bearing blocks 520 may include shaft holes 521 that are configured to receive the first shaft 524. The bearing blocks 520 may be coupled to the lift mechanism 107 such that their respective shaft holes 521 are aligned along a same first axis 525 in order to receive the first shaft 524.

The follower block 522 may be coupled to a portion of the vertical indicator 412, e.g., using fasteners, adhesives or other methods. In addition, the follower block 522 may include one or more shaft holes 523 that are configured to receive the first shaft 524. The follower block 522 may be positioned and aligned between the bearing blocks 520 such that their respective shaft holes 521, 523 are aligned along the same first axis 525 in order to receive the first shaft 524.

Because the follower block 522 is coupled to the bearing blocks 520 via the first shaft 524, the follower block 522 may rotate or pivot relative to the bearing blocks 520 around the first axis 525. In addition, because the follower block 522 is coupled to a portion of the vertical indicator 412, the vertical indicator 412 may also rotate or pivot relative to the bearing blocks 520 around the first axis 525 together with rotation or pivoting of the follower block 522. Further, the follower block 522 may be biased, e.g., due to the force of gravity, to the flat or lying down position shown in FIGS. 4 and 5A, due to the weight of the follower block 522 and vertical indicator 412 and the relative position of the first axis 525.

The leader block 526 may also include one or more shaft holes 527, e.g., on a rear side thereof as shown in FIG. 5B, that are configured to receive the first shaft 524. The leader block 526 may also be positioned and aligned between the bearing blocks 520 and relative to the follower block 522 such that their respective shaft holes 521, 523, 527 are aligned along the same first axis 525 in order to receive the first shaft 524.

Because the leader block 526 is coupled to the bearing blocks 520 and follower block 522 via the first shaft 524, the leader block 526 may also rotate or pivot relative to the bearing blocks 520 and follower block 522 around the first axis 525. Further, the leader block 526 may also be biased, e.g., due to the force of gravity, to a flat or lying down position, due to the weight of the leader block 526 and the relative position of the first axis 525.

In addition, the leader block 526 may include a breakaway component 528 that is configured to couple or decouple the leader block 526 and the follower block 522. In the example illustrated in FIGS. 5A and 5B, the breakaway component 528 may comprise a magnet. In other example embodiments, the breakaway component 528 may comprise a bistable spring, an elastic coupling, a snap fastener, a frictional engagement feature, a hook and loop fastener, or other types of breakaway components or features that may be releasable and/or reattachable.

The follower block 522 may be formed of or include a magnetic material that may be attracted to the breakaway component 528, e.g., magnet, positioned on a rear side of the leader block 526, as shown in FIG. 5B. When the magnet is attracted to a material or portion of the follower block 522, the leader block 526 and follower block 522 may pivot or rotate around the first axis 525 substantially as a unit or combined piece. However, upon overcoming the magnetic force between the magnet and the material or portion of the follower block 522, the leader block 526 and follower block 522 may pivot or rotate around the first axis 525 substantially independently. Thus, the magnet may act as a breakaway component 528 to selectively couple or decouple the leader block 526 and the follower block 522.

The spring-loaded mechanism 530 may comprise a spring-loaded or elastic cylinder or coupling that is attached to a portion of a body of the AMR at a first end 531, and that includes a piston 532 that is attached to a portion of the leader block 526 via a shaft hole 533. The spring-loaded mechanism 530 may generally maintain the piston 532 at a defined position relative to the cylinder, but the piston 532 may move relative to the cylinder, e.g., axially in or out of the cylinder, in response to forces or loads pushing or pulling the piston 532 relative to the cylinder.

The first end 531 of the spring-loaded mechanism 530 may be pivotally coupled to a portion of a body of the AMR, and the shaft hole 533 of the piston 532 may be pivotally coupled to a portion of the leader block 526 via a second shaft 534. For example, the rear face of the leader block 526 may include one or more shaft holes 537 configured to receive the second shaft 534, and the shaft hole 533 of the piston 532 may be positioned and aligned between the shaft holes 537 of the leader block 526 such that their respective shaft holes 533, 537 are aligned along the same second axis 535 in order to receive the second shaft 534.

Because the first end 531 of the spring-loaded mechanism 530 is pivotally coupled to a portion of the body of the AMR, and because the piston 532 is generally maintained at a defined position relative to the cylinder, the second axis 535 and second shaft 534 may generally be positioned at a defined position relative to the body of the AMR.

In response to movement of the lift mechanism from a retracted position to a lifting position, the bearing blocks 520 may move with the lift mechanism, thereby causing the first axis 525 and first shaft 524 to move vertically upward with the lift mechanism. As a result of the movement of the first axis 525 and first shaft 524 relative to the second axis 535 and second shaft 534, the leader block 526 may rotate around the first axis 525 due to the pivotal connection around the second axis 535, e.g., to an upright position as illustrated in FIG. 5A.

Then, while the breakaway component 528 maintains the coupling between the leader block 526 and the follower block 522, the follower block 522 may also rotate around the first axis 525 with rotation of the leader block 526, e.g., to an upright position. Further, because of the coupling between the follower block 522 and the vertical indicator 412, the vertical indicator 412 may move to the raised position with rotation of the follower block 522, e.g., as shown in FIGS. 3A and 3B.

Furthermore, in response to movement of the lift mechanism from a retracted position to a lifting position, if the breakaway component 528 does not maintain the coupling between the leader block 526 and the follower block 522, e.g., due to an overhead payload that prevents movement of the vertical indicator 412 to the raised position, the follower block 522 may not rotate around the first axis 525 with rotation of the leader block 526. Instead, the follower block 522 may remain in a flat or lying down position as illustrated in FIG. 5A. Further, because of the coupling between the follower block 522 and the vertical indicator 412, the vertical indicator 412 may also remain in the lowered position with the follower block 522, as shown in FIGS. 1A and 1B.

In response to movement of the lift mechanism from a lifting position to a retracted position, the above movements may be substantially reversed. For example, the bearing blocks 520 may move with the lift mechanism, thereby causing the first axis 525 and first shaft 524 to move vertically downward with the lift mechanism. As a result of the movement of the first axis 525 and first shaft 524 relative to the second axis 535 and second shaft 534, the leader block 526 may rotate around the first axis 525 due to the pivotal connection around the second axis 535, e.g., to a flat or lying down position.

Then, if the breakaway component 528 had maintained the coupling between the leader block 526 and the follower block 522, the follower block 522 may also rotate around the first axis 525 with rotation of the leader block 526, e.g., to a flat or lying down position as illustrated in FIG. 5A. Further, because of the coupling between the follower block 522 and the vertical indicator 412, the vertical indicator 412 may move to the lowered position with rotation of the follower block 522, as shown in FIGS. 1A and 1B.

Furthermore, in response to movement of the lift mechanism from a lifting position to a retracted position, if the breakaway component 528 had not maintained the coupling between the leader block 526 and the follower block 522, e.g., due to an overhead payload that prevented movement of the vertical indicator 412 to the raised position, the breakaway component 528 may recouple or reconnect the leader block 526 and the follower block 522 upon rotation of the leader block 526 around the first axis 525 toward a flat or lying down position, similar and adjacent to the flat or lying down position of the follower block 522 as illustrated in FIG. 5A. Further, because of the recoupling or reconnection between the leader block 526 and the follower block 522, the vertical indicator 412 may remain in the lowered position with the follower block 522, as shown in FIGS. 1A and 1B, and may subsequently be moved to the raised position in the absence of any overhead payloads that may prevent movement of the vertical indicator 412 to the raised position.

The spring-loaded mechanism 530 described herein may accommodate relative motion or slight or minimal differences or changes in position and/or orientation between the lift mechanism and portions of the body of the AMR. In example embodiments, the portions of the body of the AMR and the lift mechanism may not be rigidly connected to each other such that there may be some slight or minimal differences or changes in position and/or orientation therebetween, and the spring-loaded mechanism 530 may reliably couple a portion of the body of the AMR with a portion of the extension mechanism that at least partially moves responsive to movement of the lift mechanism.

In other example embodiments, however, the spring-loaded mechanism 530 may instead comprise a connection or coupling having a fixed or rigid distance between the first end 531 and the shaft hole 533, with each of the first end 531 and shaft hole 533 still comprising pivotable couplings to a portion of the body of the AMR and the leader block 526, respectively.

As mentioned herein, in further example embodiments, the breakaway component 528 may comprise various types of breakaway components or features, such as a magnet, an electromagnet, a bistable spring, an elastic coupling, a snap fastener, a frictional engagement feature, a hook and loop fastener, or other types of breakaway components or features. In addition, the various types of breakaway components or features may be associated with either actively or passively actuated vertical height extension systems. For example, the breakaway component 528 may comprise a bistable spring or similar element that may flex, bend, or twist to move the vertical indicator 412 between two stable positions that correspond to the lowered and raised positions, and the bistable spring may not be stable or maintainable at other positions between or different from the lowered position and the raised position. In addition, if a payload prevents movement of the vertical indicator 412 from the lowered position to the raised position, the bistable spring may move between the two stable positions, or may be maintained in one stable position, with the vertical indicator 412 remaining in the lowered position. Then, when the extension mechanism is moved from the raised position to the lowered position, the bistable spring may again move between the two stable positions, or may be maintained in one stable position.

Further, the breakaway component 528 may comprise an elastic coupling such as a torsion spring, tension spring, or other type of elastic element to move the vertical indicator 412 between the lowered and raised positions. For example, if a payload prevents movement of the vertical indicator 412 from the lowered position to the raised position, the elastic coupling may experience increased elastic loading, with the vertical indicator 412 remaining in the lowered position. Then, when the extension mechanism is moved from the raised position to the lowered position, the elastic coupling may experience decreased or no elastic loading.

Moreover, the breakaway component 528 may comprise a snap fastener, a frictional engagement feature, a hook and loop fastener, or other types of releasable fasteners or engagement features to move the vertical indicator 412 between the lowered and raised positions. For example, if a payload prevents movement of the vertical indicator 412 from the lowered position to the raised position, the releasable fasteners may release or decouple respective portions thereof, with the vertical indicator 412 remaining in the lowered position. Then, when the extension mechanism is moved from the raised position to the lowered position, the releasable fasteners may reattach or couple respective portions thereof.

Although FIGS. 4, 5A, and 5B illustrate particular types, sizes, shapes, configurations, or arrangements of an example vertical height extension system, other example embodiments may include other types, sizes, shapes, configurations, or arrangements of components of an example vertical height extension system. For example, the vertical height extension may have other sizes, shapes, configurations, or arrangements, the vertical indicator may have other types, sizes, or shapes, the extension mechanism may be actively or passively operated using or responsive to various actuation mechanisms, the breakaway component may have other types, configurations, or arrangements, various components may be combined or integrated together (such as the follower block and vertical indicator), portions of various components may be separated or formed individually, and/or various other modifications may be made to components of an example vertical height extension system.

FIGS. 6A-6E are schematic side view diagrams 600A, 600B, 600C, 600D, 600E of example positions of a vertical height extension system of an autonomous mobile robot, in accordance with implementations of the present disclosure.

Figure 6B:
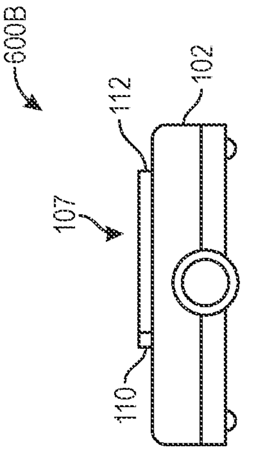
FIGS. 6A-6E are schematic side view diagrams of example positions of a vertical height extension system of an autonomous mobile robot, in accordance with implementations of the present disclosure.
Figure 6A:
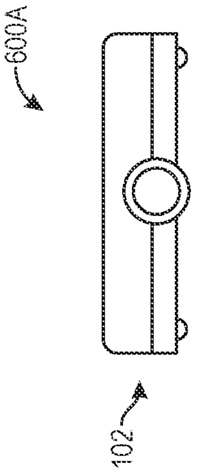

As shown in FIGS. 6A-6E, example positions of a vertical height extension of an AMR in the absence of any overhead payload are described. As shown in FIG. 6A, the lift mechanism of the AMR is in the retracted position, e.g., a lowest position relative to the body 102 of the AMR. Furthermore, in the example illustrated, the vertical indicator 112 may be substantially nested within or positioned relative to the lift mechanism 107 or portions of the body 102 of the AMR such that the vertical indicator 112 and extension mechanism 110 are not the most vertically prominent portions of the AMR.

As shown in FIG. 6B, the lift mechanism 107 of the AMR has begun moving from the retracted position to the lifting position. In the intermediate position shown in FIG. 6B, e.g., with the lift mechanism raised approximately 30-40 mm from the lowest position, the extension mechanism 110 may initiate or begin movement or pivoting of the vertical indicator 112 from the lowered position to the raised position.

Figure 6E:
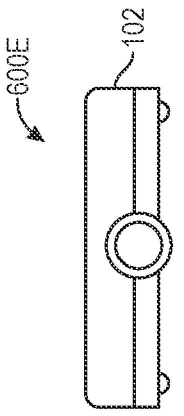
Figure 6D:
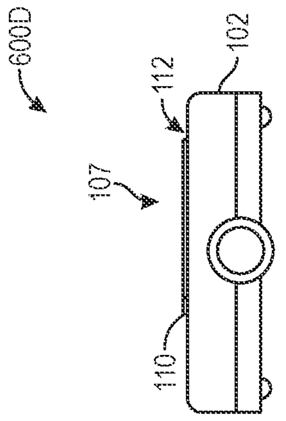
Figure 6C:
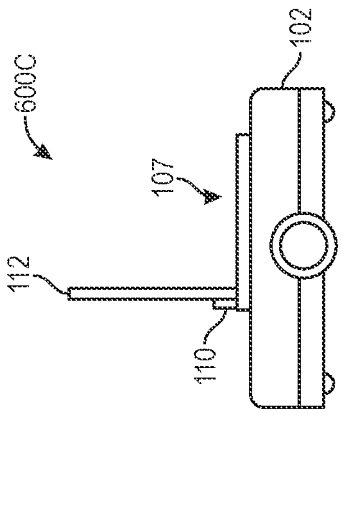

As shown in FIG. 6C, the lift mechanism 107 of the AMR may have completed movement from the retracted position to the lifting position. In the lifting position shown in FIG. 6C, e.g., with the lift mechanism raised approximately 50-60 mm from the lowest position, the extension mechanism 110 may have also completed movement or pivoting of the vertical indicator 112 from the lowered position to the raised position. In the example illustrated, the vertical indicator 112 may be substantially vertically positioned in the raised position.

As shown in FIG. 6D, the lift mechanism 107 of the AMR may have completed movement from the lifting position back to the retracted position. In the retracted position shown in FIG. 6D, e.g., with the lift mechanism still raised approximately 10-20 mm from the lowest position, the extension mechanism 110 may have also completed movement or pivoting of the vertical indicator 112 from the raised position to the lowered position. In the example illustrated, the vertical indicator 112 may again be substantially nested within or positioned relative to the lift mechanism 107 or portions of the body 102 of the AMR such that the vertical indicator 112 and extension mechanism 110 are not the most vertically prominent portions of the AMR.

Finally, as shown in FIG. 6E, the lift mechanism of the AMR is again back in the retracted position, e.g., a lowest position relative to the body 102 of the AMR. Furthermore, in the example illustrated, the vertical indicator 112 may be substantially nested within or positioned relative to the lift mechanism 107 or portions of the body 102 of the AMR.

FIGS. 7A-7F are schematic side view diagrams 700A, 700B, 700C, 700D, 700E, 700F of example positions of a vertical height extension system of an autonomous mobile robot that is positioned under a cart, in accordance with implementations of the present disclosure.

Figure 7A:
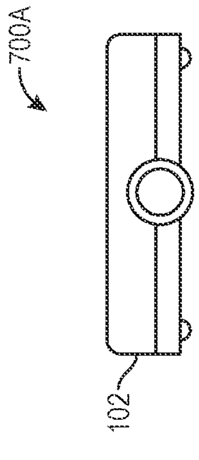
FIGS. 7A-7F are schematic side view diagrams of example positions of a vertical height extension system of an autonomous mobile robot that is positioned under a cart, in accordance with implementations of the present disclosure.

As shown in FIGS. 7A-7F, example positions of a vertical height extension of an AMR in the presence of an overhead payload 208 are described. As shown in FIG. 7A, the lift mechanism of the AMR is in the retracted position, e.g., a lowest position relative to the body 102 of the AMR. Furthermore, in the example illustrated, the vertical indicator 112 may be substantially nested within or positioned relative to the lift mechanism 107 or portions of the body 102 of the AMR such that the vertical indicator 112 and extension mechanism 110 are not the most vertically prominent portions of the AMR.

Figure 7B:
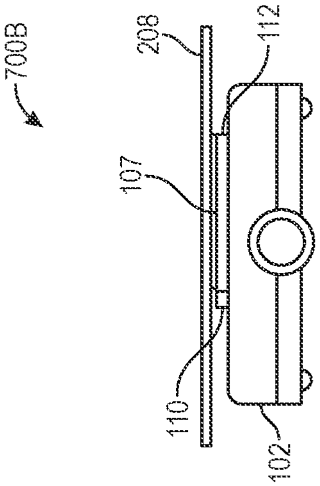

As shown in FIG. 7B, the lift mechanism 107 of the AMR has begun moving from the retracted position to the lifting position. In the first intermediate position shown in FIG. 7B, e.g., with the lift mechanism raised approximately 10-20 mm from the lowest position, the lift mechanism 107 may initiate or begin contact with an underside or other portion of the payload 208, and the extension mechanism 110 may not yet have initiated or begun movement or pivoting of the vertical indicator 112 from the lowered position to the raised position. Furthermore, in the example illustrated, the vertical indicator 112 may remain substantially nested within or positioned relative to the lift mechanism 107 or portions of the body 102 of the AMR.

Figure 7C:
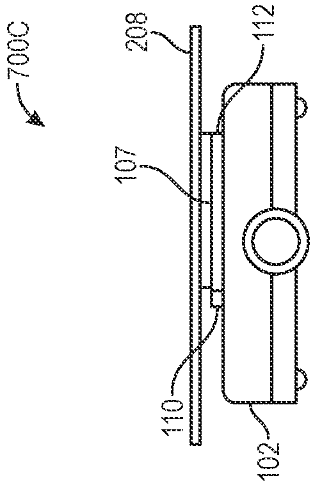

As shown in FIG. 7C, the lift mechanism 107 of the AMR has continued moving from the retracted position to the lifting position. In the second intermediate position shown in FIG. 7C, e.g., with the lift mechanism raised approximately 30-40 mm from the lowest position, the extension mechanism 110 may initiate or begin movement or pivoting of the vertical indicator 112 from the lowered position to the raised position. However, the payload may prevent the attempted movement of the vertical indicator 112 to the raised position by the extension mechanism 110.

Figure 7D:
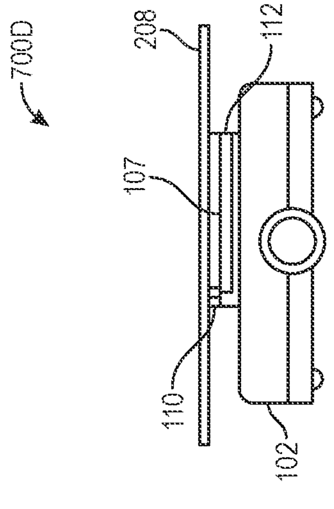

As shown in FIG. 7D, the lift mechanism 107 of the AMR may have completed movement from the retracted position to the lifting position. In the lifting position shown in FIG. 7D, e.g., with the lift mechanism raised approximately 50-60 mm from the lowest position, the extension mechanism 110 may have also completed attempted movement or pivoting of the vertical indicator 112 from the lowered position to the raised position. However, because the payload prevents movement of the vertical indicator 112 to the raised position, a breakaway component of the extension mechanism 110 may decouple the vertical indicator 112 from the extension mechanism 110, such that the vertical indicator 112 remains in the lowered position. In additional example embodiments, a portion of the extension mechanism 110, e.g., an upper surface of one or more blocks such as a leader block, may contact an underside or other portion of the payload 208 to provide greater stability to the engaged, lifted, and moved payload 208.

Figure 7E:
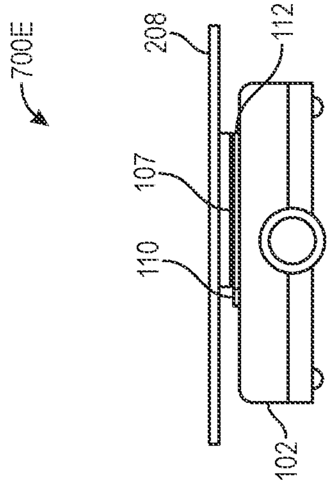

As shown in FIG. 7E, the lift mechanism 107 of the AMR may have completed movement from the lifting position back to the retracted position. In the retracted position shown in FIG. 7E, e.g., with the lift mechanism still raised approximately 10-20 mm from the lowest position, the extension mechanism 110 may have also completed attempted movement or pivoting of the vertical indicator 112 from the raised position to the lowered position. However, because the payload had prevented movement of the vertical indicator 112 to the raised position, and because the breakaway component of the extension mechanism 110 may have decoupled the vertical indicator 112 from the extension mechanism 110, the breakaway component of the extension mechanism 110 may then couple or reconnect the vertical indicator 112 with the extension mechanism 110, while the vertical indicator 112 still remains in the lowered position. Furthermore, in the example illustrated, the vertical indicator 112 may remain substantially nested within or positioned relative to the lift mechanism 107 or portions of the body 102 of the AMR such that the vertical indicator 112 and extension mechanism 110 are not the most vertically prominent portions of the AMR.

Figure 7F:
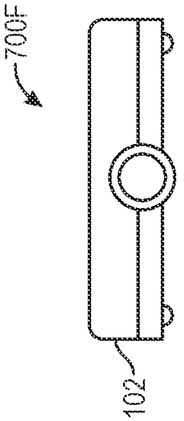

Finally, as shown in FIG. 7F, the lift mechanism of the AMR is again back in the retracted position, e.g., a lowest position relative to the body 102 of the AMR. Furthermore, in the example illustrated, the vertical indicator 112 may be substantially nested within or positioned relative to the lift mechanism 107 or portions of the body 102 of the AMR.

Although FIGS. 6A-6E and FIGS. 7A-7F generally describe initial and final states of the AMR with the vertical height extension system in the lowered position, e.g., which may be referred to as a default state, other example embodiments may utilize various other positions or orientations of the vertical height extension system as initial, final, and/or default positions or states.

For example, in additional example embodiments, a default state of the vertical height extension system may include the vertical indicator positioned or oriented in the raised position, similar to that illustrated in FIGS. 3A, 3B, and 6C. In such examples, during navigation of the AMR without an engaged payload, the vertical indicator 112 of the AMR may be generally positioned in the raised position to increase vertical height and visibility of the AMR. In addition, responsive to navigation of the AMR under a payload, the vertical indicator 112 of the AMR may be moved to the lowered position, either actively using an actuator or passively via a breakaway component or feature. Thereafter, during navigation or operation under a payload and/or engaged with a payload, the vertical indicator 112 of the AMR may generally remain in the lowered position. Further, responsive to subsequent navigation of the AMR without an overhead and/or engaged payload, the vertical indicator 112 of the AMR may be moved or return to the raised position, again either actively using an actuator or passively via a breakaway component or feature. Furthermore, various other initial, final, and/or default positions or states between the fully raised position and the fully lowered position of the vertical height extension system relative to the AMR are possible.

Figure 8:
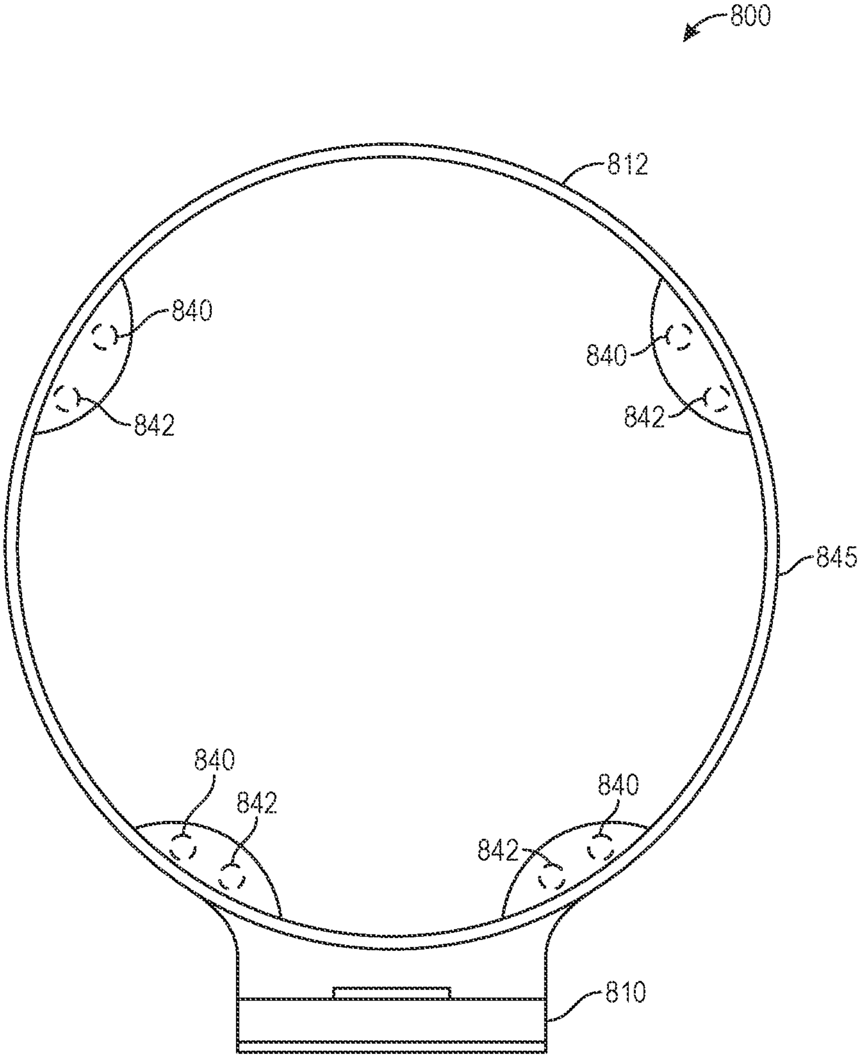
FIG. 8 is a schematic plan view diagram of a portion of an example vertical height extension system, in accordance with implementations of the present disclosure.

FIG. 8 is a schematic plan view diagram 800 of a portion of an example vertical height extension system, in accordance with implementations of the present disclosure.

As shown in FIG. 8, an example vertical height extension system may include an extension mechanism 810 and a vertical indicator 812. As described herein, the vertical indicator 812 may comprise various types, sizes, or shapes, and FIG. 8 illustrates an example embodiment in which the vertical indicator 812 comprises a ring or halo shape 845 that moves between a lowered position and a raised position.

In example embodiments, the vertical indicator 812 may be sized or shaped to visually indicate a size, position, and/or orientation of the AMR. For example, the vertical indicator 812 may have a height, width, length, thickness, or other dimensions to visually indicate or approximate corresponding height, width, length, or other dimensions of the AMR. In addition, the vertical indicator 812 may be symmetrical and/or asymmetrical to visually indicate position and/or orientation of the AMR. For example, the vertical indicator 812 may be symmetrical left-to-right to indicate left and right sides of the AMR, but the vertical indicator 812 may be asymmetrical front-to-rear to indicate a front side or forward direction of motion of the AMR as opposed to a rear side or rearward direction of motion of the AMR. In other example embodiments, the vertical indicator 812 may have other symmetrical and/or asymmetrical aspects to visually indicate position and/or orientation of the AMR. In this manner, a human associate working in collaboration with the AMR may visually discern or understand a size, position, and/or orientation of the AMR relatively quickly and safely based on the size, position, and/or orientation of the vertical indicator 812 of the AMR in a raised position.

In additional example embodiments, the vertical indicator 812 may include visual emitters 840, such as lights, light emitting diodes (LEDs), screens, displays, projectors, or other light sources or emitters, and/or audio emitters 842, such as speakers, piezoelectric elements, or other audio sources or emitters. In addition, the vertical indicator 812 may also include one or more actuators, including an actuator associated with an extension mechanism 810 that is actively actuated, and associated movable parts, elements, or components at various portions of the vertical indicator 812.

For example, the visual emitters 840 may emit visual signals or light including various types, frequencies, colors, patterns, sequences, or other attributes. The various attributes of visual signals or light may be selected or defined to convey or communicate different types of information related to the AMR and/or its operations. In addition, the audio emitters 842 may emit audio signals or sound including various types, frequencies, wavelengths, patterns, sequences, words, statements, alerts, warnings, or other attributes. The various attributes of audio signals or sound may also be selected or defined to convey or communicate different types of information related to the AMR and/or its operations. Further, the various actuators and associated movable elements at portions of the vertical indicator 812 may move, vibrate, pulse, rotate, pivot, reposition, reorient, or otherwise modify a visual appearance of all or portions of the vertical indicator 812. Likewise, the various movements or modifications of portions of the vertical indicator 812 may be selected or defined to convey or communicate different types of information related to the AMR and/or its operations.

The different types of information that may be communicated via actuation or operation of visual emitters 840, audio emitters 842, and/or actuators and associated movable elements may include information related to size, dimensions, position, orientation, direction of travel or motion, movement, speed, acceleration, intent, current task, destination, operational status, and/or various other attributes or information related to the AMR and/or its operations. In addition, various aspects of movement, intent, or operational status of the AMR may be communicated by visual emitters 840, audio emitters 842, and/or actuators and associated movable elements, such as remaining sleeping or idle, beginning or initiating movement, accelerating, forward motion, rearward motion, turning left, turning right, decelerating or braking, stopping, and/or various other movements, intents, or operations of the AMR.

As an example, to communicate an idle operational status, one or more visual emitters 840 may emit blue light at a low pulsing frequency, and/or one or more audio emitters 842 may emit a low frequency sound at a low pulsing rate. In addition, an actuator of the extension mechanism may move, reposition, or reorient the vertical indicator, e.g., to a resting, default, or staticly raised position, to indicate an idle status, and/or one or more actuators may pulse or oscillate movable elements at a low frequency or move various movable elements to indicate an idle status.

In another example, to communicate initiating movement or acceleration, one or more visual emitters 840 may emit green light with an increasing pulsing frequency, and/or one or more audio emitters 842 may emit sound at an increasing frequency and/or with an increasing pulsing rate. In addition, an actuator of the extension mechanism may move, reposition, or reorient the vertical indicator, e.g., to an accelerating position that may be angled toward a rearward direction of travel, to indicate a movement operation, and/or one or more actuators may pulse or oscillate movable elements at an increasing frequency or move various movable elements to indicate a movement operation.

In a further example, to communicate turning or rotational motion, one or more visual emitters 840 may emit amber light that indicates a turning direction, and/or one or more audio emitters 842 may emit directional alert sounds toward a turning direction. In addition, an actuator of the extension mechanism may move, reposition, or reorient the vertical indicator, e.g., to a turning position that may be angled toward a turning direction, to indicate a turning operation, and/or one or more actuators may pulse or oscillate movable elements toward a turning direction or move various movable elements to indicate a turning operation.

In yet another example, to communicate decelerating, braking, or stopping, one or more visual emitters 840 may emit red light with a decreasing pulsing frequency, and/or one or more audio emitters 842 may emit sound at a decreasing frequency and/or with a decreasing pulsing rate. In addition, an actuator of the extension mechanism may move, reposition, or reorient the vertical indicator, e.g., to a decelerating or braking position that may be angled toward a forward direction of travel, to indicate a slowing, braking, or stopping operation, and/or one or more actuators may pulse or oscillate movable elements at a decreasing frequency or move various movable elements to indicate a slowing, braking, or stopping operation.

The visual emitters 840, audio emitters 842, and/or one or more actuators and associated movable elements may be actuated or operated in various other manners and/or combinations to communicate information or other aspects of the AMR and/or its operations. For example, the audio emitters 842 may emit human-discernable words, alerts, warnings, statements, or other information to communicate with associates in proximity.

Further, the visual emitters 840, audio emitters 842, and/or one or more actuators and associated movable elements may be configured or arranged to simulate portions of a computerized, electronic, or simulated face, countenance, or visage, e.g., including eyes, eyelids, eyebrows, mouth, nose, or other parts of a simulated face. Then, the visual emitters 840, audio emitters 842, and/or one or more actuators and associated movable elements may be actuated or operated to communicate various states, intents, actions, movements, or other attributes via the simulated face or visage and thereby facilitate safe and collaborative operations of the AMR with human associates within a facility.

Figure 9A:
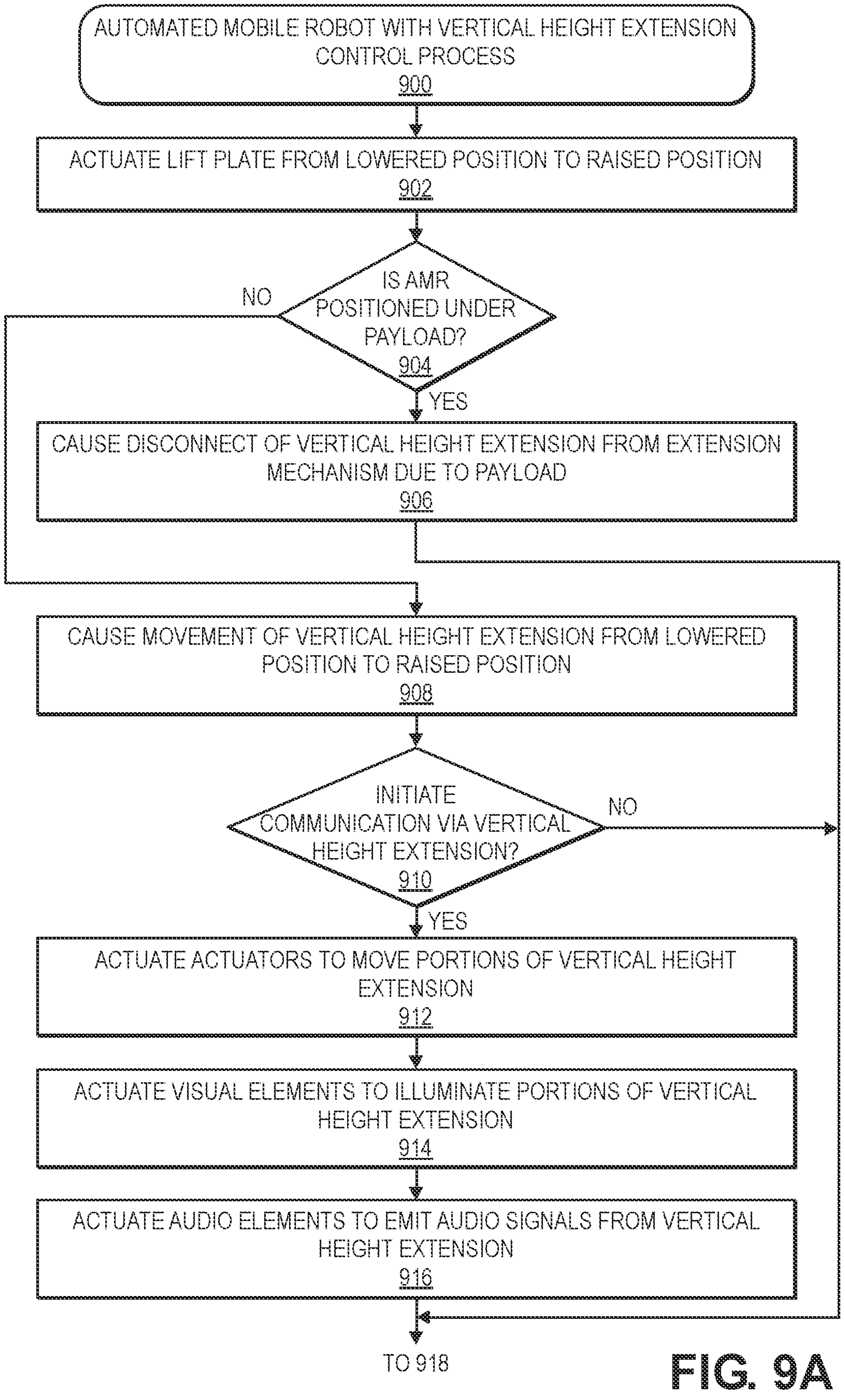
FIGS. 9A-9B is a flow diagram illustrating an example automated mobile robot with vertical height extension control process, in accordance with implementations of the present disclosure.
Figure 9B:
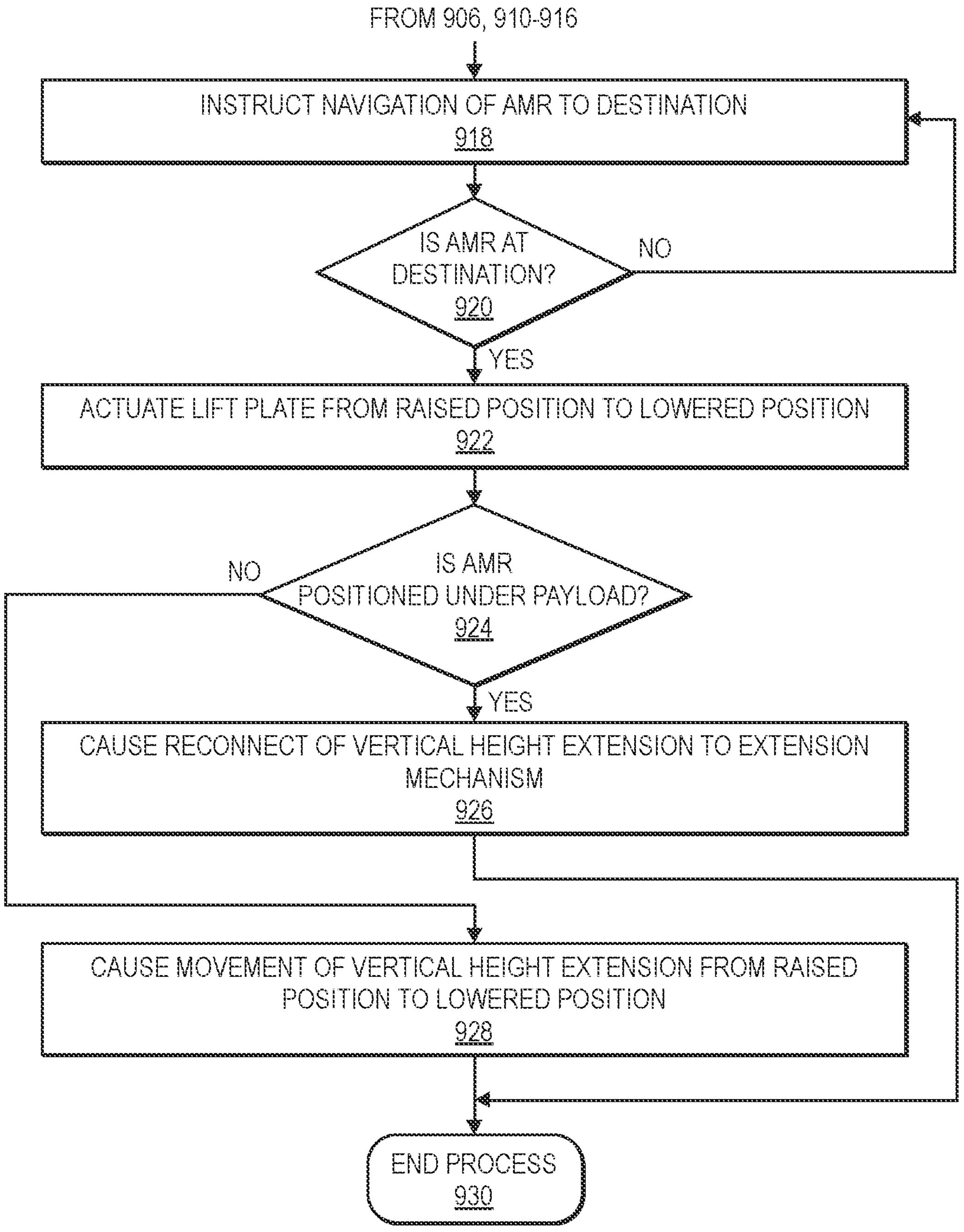

FIGS. 9A-9B is a flow diagram 900 illustrating an example automated mobile robot with vertical height extension control process, in accordance with implementations of the present disclosure.

The process 900 may begin by actuating a lift plate from a lowered position to a raised position, as at 902. For example, a lift mechanism of an AMR may be actuated to move a lift plate, e.g., an upper portion of the lift mechanism, from a retracted or lowered position to a lifting or raised position. Various actuators may be associated with the lift mechanism and AMR to cause movement of the lift plate between the retracted position and the lifting position. Further, a control system may instruct actuation of the lift plate from the retracted position to the lifting position.

The process 900 may continue by determining whether the AMR is positioned under a payload, as at 904. For example, when the AMR is positioned under a payload, a vertical height extension may be prevented from moving a vertical indicator from a lowered position to a raised position. In contrast, when the AMR is not positioned under a payload, a vertical height extension may move a vertical indicator from a lowered position to a raised position. Further, step 904 may generally comprise a passive determination based on a current state or position of the AMR.

If the AMR is positioned under a payload, the process 900 may proceed by causing disconnect of the vertical height extension from the extension mechanism due to the payload, as at 906. For example, responsive to a payload being positioned overhead, a vertical indicator may be disconnected or decoupled, e.g., via a breakaway component or feature, from the extension mechanism of the vertical height extension. As a result, the vertical indicator may remain in the lowered position even though the lift mechanism is actuated to the lifting position, as well as a portion of the extension mechanism being moved to the raised position. Further, step 906 may also generally comprise a passive disconnection or decoupling based on movement of the extension mechanism and presence of an overhead payload.

If, however, the AMR is not positioned under a payload, the process 900 may continue to cause movement of the vertical height extension from a lowered position to a raised position, as at 908. For example, responsive to actuation of the lift mechanism to the lifting position, the extension mechanism of the vertical height extension may cause movement or pivoting of the vertical indicator from a lowered position to a raised position. As a result, the vertical indicator may move or pivot to the raised position, e.g., to increase a vertical height and visibility of the AMR. Further, step 908 may also generally comprise a passive movement of the vertical indicator to the raised position based on actuation of the lift mechanism and corresponding movement of the extension mechanism. In alternative embodiments in which the vertical height extension includes an actuator to move between the lowered and raised positions, the actuator may cause movement of the vertical height extension from the lowered position to the raised position.

The process 900 may then proceed to determine whether to initiate communication via the vertical height extension, as at 910. For example, if the vertical height extension, e.g., portions of the vertical indicator, include one or more visual emitters, audio emitters, and/or actuators and associated movable elements, it may be determined whether to communicate one or more aspects of the AMR and/or its operations using the visual emitters, audio emitters, and/or actuators and associated movable elements. As described herein, various types of information may be communicated via the one or more additional emitters, actuators, or elements, such as size, dimensions, position, orientation, direction of travel or motion, movement, speed, acceleration, intent, current task, destination, operational status, and/or various other attributes or information related to the AMR and/or its operations. Further, a control system may determine whether to initiate communication via one or more additional emitters, actuators, or elements.

If it is determined to initiate communication via the vertical height extension, the process 900 may continue with actuating one or more actuators to move portions of the vertical height extension, as at 912, actuating visual elements to illuminate portions of the vertical height extension, as at 914, and/or actuating audio elements to emit audio signals from the vertical height extension, as at 916. As further described herein, the one or more additional emitters, actuators, or elements may be actuated or operated in various manners and/or combinations to communicate information or other aspects of the AMR and/or its operations. Further, a control system may instruct actuation of one or more additional emitters, actuators, or elements to communicate information.

If it is determined not to initiate communication via the vertical height extension, and/or responsive to causing disconnect or decoupling of the vertical height extension due to an overhead payload, and/or after or during communication via the one or more additional emitters, actuators, or elements, the process 900 may proceed with instructing navigation of the AMR to a destination, as at 918. For example, the AMR may navigate via the one or more drive mechanisms within a material handling facility to perform various tasks. If the AMR is not moving an engaged and lifted payload, movement of the vertical height extension to the raised position may increase a vertical height and improve visibility of the AMR during navigation within the facility, thereby improving safe and collaborative operations with human associates. Further, a control system may instruct navigation of the AMR to a destination.

The process 900 may continue by determining whether the AMR is at the destination, as at 920. For example, an AMR may navigate within a facility using various sensors, imaging devices, cameras, location sensors, or other positioning sensors or systems. In addition, the AMR may be in communication with a control system to receive navigation instructions and to transmit current location and other data or information about the AMR. Further, a control system may determine whether the AMR has completed navigation to the destination. If it is determined that the AMR has not completed navigation to the destination, the process 900 may return to step 918 to continue instructing navigation of the AMR to the destination.

If, however, it is determined that the AMR has completed navigation to the destination, the process 900 may proceed by actuating the lift plate from the raised position to the lowered position, as at 922. For example, a lift mechanism of an AMR may be actuated to move a lift plate, e.g., an upper portion of the lift mechanism, from a lifting or raised position to a retracted or lowered position. Various actuators may be associated with the lift mechanism and AMR to cause movement of the lift plate between the retracted position and the lifting position. Further, a control system may instruct actuation of the lift plate from the lifting position to the retracted position.

The process 900 may continue to determine whether the AMR is positioned under a payload, as at 924. For example, when the AMR is positioned under a payload, a vertical height extension may have been prevented from moving a vertical indicator from a lowered position to a raised position. In contrast, when the AMR is not positioned under a payload, a vertical height extension may have moved a vertical indicator from a lowered position to a raised position. Further, step 924 may generally comprise a passive determination based on a current state or position of the AMR.

If the AMR is positioned under a payload, the process 900 may proceed to cause reconnect of the vertical height extension to the extension mechanism, as at 926. For example, responsive to a payload being positioned overhead, a vertical indicator may have been disconnected or decoupled, e.g., via a breakaway component or feature, from the extension mechanism of the vertical height extension. Upon moving or actuating the extension mechanism from the raised position to the lowered position, the vertical indicator may reconnect or recouple, e.g., via the breakaway component or feature, with the extension mechanism of the vertical height extension. As a result, the vertical indicator may again be coupled to the extension mechanism and remain in the lowered position, responsive to the lift mechanism being actuated to the retracted position, as well as a portion of the extension mechanism being moved to the lowered position. Further, step 926 may also generally comprise a passive reconnection or recoupling based on retracting of the lift mechanism and corresponding movement of the extension mechanism.

If, however, the AMR is not positioned under a payload, the process 900 may continue with causing movement of the vertical height extension from a raised position to a lowered position, as at 928. For example, responsive to actuation of the lift mechanism to the retracted position, the extension mechanism of the vertical height extension may cause movement or pivoting of the vertical indicator from a raised position to a lowered position. As a result, the vertical indicator may move or pivot to the lowered position, e.g., to reduce a vertical height of the AMR. Further, step 928 may also generally comprise a passive movement of the vertical indicator to the lowered position based on actuation of the lift mechanism and corresponding movement of the extension mechanism. In alternative embodiments in which the vertical height extension includes an actuator to move between the lowered and raised positions, the actuator may cause movement of the vertical height extension from the raised position to the lowered position.

The process 900 may then end, as at 930.

Figure 10:
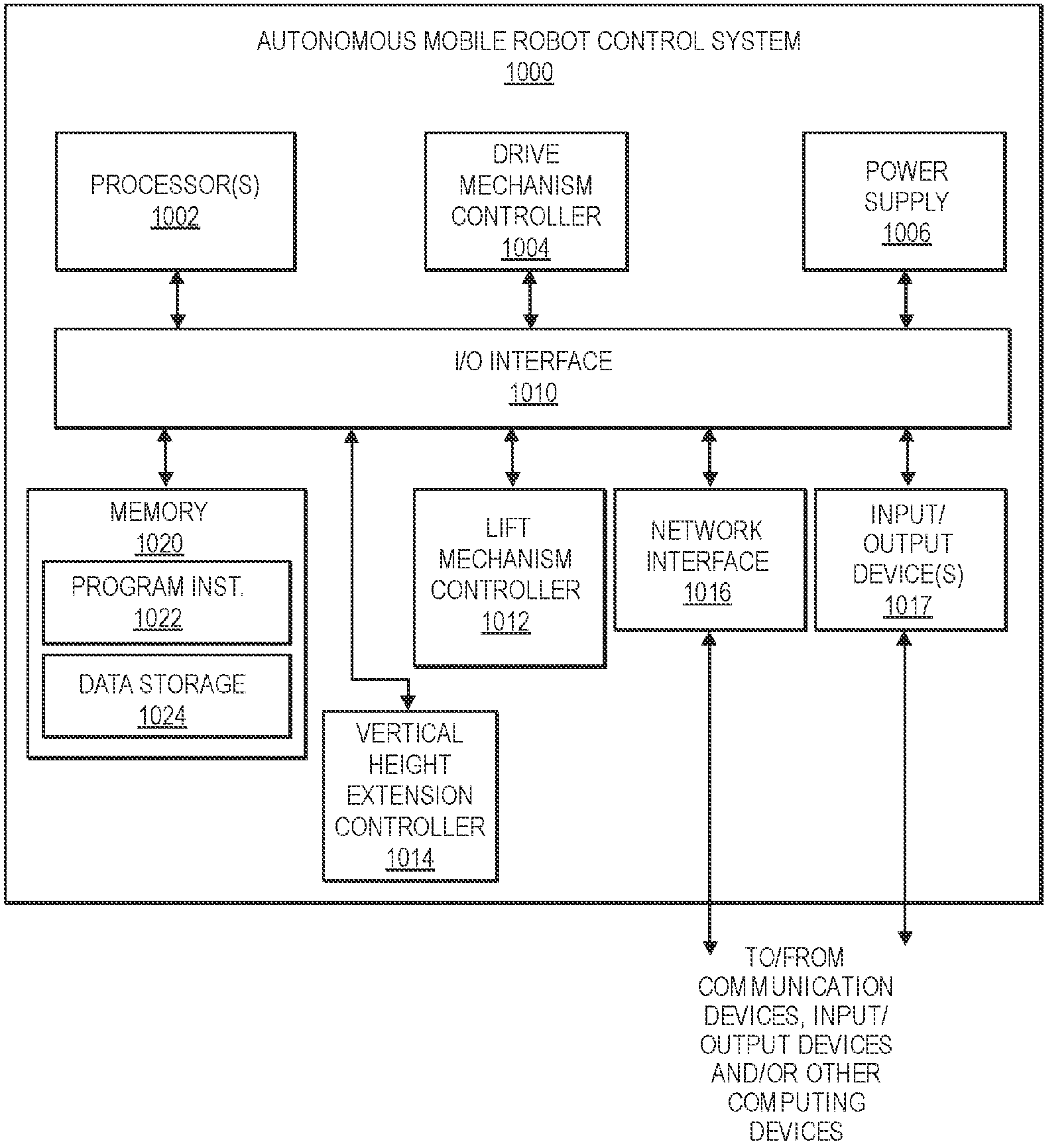
FIG. 10 is a block diagram illustrating various components of an example autonomous mobile robot control system, in accordance with implementations of the present disclosure.

FIG. 10 is a block diagram illustrating various components of an example autonomous mobile robot control system 1000, in accordance with implementations of the present disclosure.

In various examples, the block diagram may be illustrative of one or more aspects of the AMR controller or control system 1000 that may be used to implement the various systems and processes discussed above. In the illustrated implementation, the AMR control system 1000 includes one or more processors 1002, coupled to a non-transitory computer-readable storage medium 1020 via an input/output (I/O) interface 1010. The AMR control system 1000 may also include a drive mechanism controller 1004 and a power supply or battery 1006. The AMR control system 1000 may further include a lift mechanism controller 1012, a vertical height extension controller 1014, a network interface 1016, and one or more input/output devices 1017.

In various implementations, the AMR control system 1000 may be a uniprocessor system including one processor 1002, or a multiprocessor system including several processors 1002 (e.g., two, four, eight, or another suitable number). The processor(s) 1002 may be any suitable processor capable of executing instructions. For example, in various implementations, the processor(s) 1002 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1002 may commonly, but not necessarily, implement the same ISA.

The non-transitory computer-readable storage medium 1020 may be configured to store executable instructions, applications, drivers, and/or data, such as AMR data, attributes, or characteristics, hardware or component data, navigation system data, drive mechanism data, lift mechanism data, vertical height extension system data, visual element or emitter data, audio element or emitter data, movable element data, actuator data, sensor data, payload data, and/or other data items accessible by the processor(s) 1002. In various implementations, the non-transitory computer-readable storage medium 1020 may be implemented using any suitable memory technology, such as static random-access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1020 as program instructions 1022 and data storage 1024. In other implementations, program instructions, applications, drivers, and/or data may be received, sent or stored upon different types of computer-accessible media, such as non-transitory media, or on similar media separate from the non-transitory computer-readable storage medium 1020 or the AMR control system 1000.

Generally, a non-transitory, computer-readable storage medium 1020 may include storage media or memory media such as magnetic or optical media, e.g., disk or CD/DVD-ROM, coupled to the AMR control system 1000 via the I/O interface 1010. Program instructions and data stored via a non-transitory computer-readable medium may be transmitted by transmission media or signals, such as electrical, electromagnetic, or digital signals, which may be conveyed via a communication medium such as a network and/or a wireless link, such as may be implemented via the network interface 1016.

In one implementation, the I/O interface 1010 may be configured to coordinate I/O traffic between the processor(s) 1002, the non-transitory computer-readable storage medium 1020, and any peripheral devices, the network interface 1016 or other peripheral interfaces, such as input/output devices 1017. In some implementations, the I/O interface 1010 may perform any necessary protocol, timing or other data transformations to convert data signals from one component (e.g., non-transitory computer readable storage medium 1020) into a format suitable for use by another component (e.g., processor(s) 1002). In some implementations, the I/O interface 1010 may include support for devices attached through various types of peripheral buses, such as a variant of the Peripheral Component Interconnect (PCI) bus standard or the Universal Serial Bus (USB) standard, for example. In some implementations, the function of the I/O interface 1010 may be split into two or more separate components, such as a north bridge and a south bridge, for example. Also, in some implementations, some or all of the functionality of the I/O interface 1010, such as an interface to the non-transitory computer-readable storage medium 1020, may be incorporated directly into the processor(s) 1002.

The drive mechanism controller 1004 may communicate with the processor(s) 1002, the non-transitory computer-readable storage medium 1020, the lift mechanism controller 1012, the vertical height extension controller 1014, and/or other components described herein to adjust the operational characteristics of motors or other actuators associated with each drive mechanism to move the AMR along a determined path to a destination and/or to perform other navigational maneuvers or operations, including moving forward, moving rearward, turning or rotating, moving in a desired direction, moving at a desired speed, moving with a desired acceleration, and/or various combinations thereof.

The AMR control system 1000 may also include a lift mechanism controller 1012 that communicates with the processor(s) 1002, the drive mechanism controller 1004, the vertical height extension controller 1014, the non-transitory computer-readable storage medium 1020, and/or other components described herein to engage, couple, lift, move, lower, decouple, and/or disengage one or more items, containers, packages, payloads, or other objects.

The AMR control system 1000 may also include a vertical height extension controller 1014 that communicates with the processor(s) 1002, the drive mechanism controller 1004, the non-transitory computer readable storage medium 1020, one or more sensors, the lift mechanism controller 1012, and/or other components described herein. The vertical height extension controller 1014 may include or be in communication with any actuators included in the extension mechanism, e.g., an actively controlled extension mechanism, and/or may be in communication with a lift mechanism controller 1012, e.g., a passively actuated extension mechanism. In addition, the vertical height extension controller 1014 may include or be in communication with any additional visual elements or emitters, audio elements or emitters, and/or actuators and associated movable elements of the vertical indicator, e.g., in order to communicate aspects or information related to the AMR and/or its operations.

The network interface 1016 may be configured to allow data to be exchanged between the AMR control system 1000, other devices attached to a network, such as other computer systems, control systems, management control systems, material handling system controllers, controllers or control systems of other AMRs, and/or other vehicles, systems, machines, equipment, apparatuses, systems, sensors, or devices associated with various facilities or environments. For example, the network interface 1016 may enable wireless communication between numerous AMRs, and/or between individual AMRs and a control system. In various implementations, the network interface 1016 may support communication via wireless general data networks, such as a Wi-Fi network. For example, the network interface 1016 may support communication via telecommunications networks such as cellular communication networks, satellite networks, and the like.

Input/output devices 1017 may, in some implementations, include one or more visual input/output devices, audio input/output devices, displays, imaging sensors, thermal sensors, infrared sensors, LIDAR, radar, or other time of flight sensors, GPS sensors, indoor positioning system sensors, position encoders, speedometers, inertial measurement units, accelerometers, gyroscopes, weight, load, or pressure sensors, various other sensors described herein, etc. Multiple input/output devices 1017 may be present and controlled by the AMR control system 1000. One or more of these sensors may be utilized to assist in performing the various functions, operations, and processes described herein.

As shown in FIG. 10, the memory may include program instructions 1022 which may be configured to implement the example processes and/or sub-processes described above. The data storage 1024 may include various data stores for maintaining data items that may be provided for performing the various functions, operations, and processes described herein. For example, the data storage 1024 may include AMR data, attributes, or characteristics, hardware or component data, navigation system data, drive mechanism data, lift mechanism data, vertical height extension system data, visual element or emitter data, audio element or emitter data, movable element data, actuator data, sensor data, payload data, and/or other data items.

Those skilled in the art will appreciate that the AMR control system 1000 is merely illustrative and is not intended to limit the scope of the present disclosure. In particular, the computing system and devices may include any combination of hardware or software that can perform the indicated functions, including other control systems or controllers, computers, network devices, robotic devices, etc. The AMR control system 1000 may also be connected to other devices that are not illustrated, or instead may operate as a standalone system. In addition, the functionality provided by the illustrated components may, in some implementations, be combined in fewer components or distributed in additional components. Similarly, in some implementations, the functionality of some of the illustrated components may not be provided and/or other additional functionality may be available.

While the above examples have been described with respect to ground-based vehicles, the disclosed implementations may also be used for other forms of vehicles, including, but not limited to, aerial vehicles, water-based vehicles, or other types of vehicles or autonomous robots.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow chart shown in FIGS. 9A-9B, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An autonomous mobile robot, comprising:

a body;

a drive mechanism;

a lift mechanism configured to move between a lifting position and a retracted position; and a vertical height extension configured to move between a raised position and a lowered position, the vertical height extension comprising:

a vertical indicator; and an extension mechanism having an actuator and a breakaway component configured to couple and decouple with the vertical indicator;

wherein the extension mechanism is configured to cause movement of the vertical indicator responsive to movement of the lift mechanism between the lifting position and the retracted position.

2. The autonomous mobile robot of claim 1, wherein the actuator causes movement of the vertical indicator of the vertical height extension between the raised position and the lowered position.

3. The autonomous mobile robot of claim 1, wherein the actuator is configured to move the vertical indicator between a plurality of positions to communicate at least one attribute associated with the autonomous mobile robot; and wherein the at least one attribute comprises at least one of a size, position, orientation, direction of motion, intent, task, destination, or operational status.

4. The autonomous mobile robot of claim 1, wherein the vertical indicator of the vertical height extension includes at least one of a material, a surface texture, or a surface feature configured to selectively reflect, refract, diffract, disperse, or absorb at least a portion of light.

5. The autonomous mobile robot of claim 1, wherein the breakaway component comprises a magnet that is configured to decouple from the vertical indicator responsive to movement of the extension mechanism to the raised position and presence of an overhead payload.

6. An apparatus, comprising:

a body;

a drive mechanism;

a lift mechanism configured to move between a lifting position and a retracted position; and a vertical height extension configured to move between a raised position and a lowered position responsive to movement of the lift mechanism between the lifting position and the retracted position;

wherein in the raised position, the vertical height extension increases a vertical height and visibility of the apparatus.

7. The apparatus of claim 6, wherein the vertical height extension comprises:

a vertical indicator configured to move between the raised position and the lowered position;

wherein the vertical indicator comprises at least one of a ring, circle, oval, triangle, square, rectangle, polygon, beam, mast, flag, tube, or balloon.

8. The apparatus of claim 7, wherein the vertical height extension further comprises:

an extension mechanism configured to move the vertical indicator between the raised position and the lowered position.

9. The apparatus of claim 8, wherein the extension mechanism comprises an actuator to cause movement of the vertical indicator between the raised position and the lowered position; and wherein the actuator comprises at least one of a servo, a solenoid, a motor, a linear actuator, a rotary actuator, a pneumatic actuator, a telescoping actuator or mechanism, a fan, or a pump.

10. The apparatus of claim 8, wherein the extension mechanism further comprises a breakaway component configured to couple and decouple with the vertical indicator.

11. The apparatus of claim 10, wherein the breakaway component comprises at least one of a magnet, an electromagnet, a bistable spring, an elastic coupling, a snap fastener, a frictional engagement feature, or a hook and loop fastener.

12. The apparatus of claim 8, wherein the extension mechanism is configured to cause movement of the vertical indicator responsive to movement of the lift mechanism between the lifting position and the retracted position.

13. The apparatus of claim 12, wherein the extension mechanism causes pivoting of the vertical indicator to the raised position responsive to movement of the lift mechanism to the lifting position; and wherein the extension mechanism causes pivoting of the vertical indicator to the lowered position responsive to movement of the lift mechanism to the retracted position.

14. The apparatus of claim 13, wherein the extension mechanism further comprises a breakaway component configured to couple and decouple with the vertical indicator;

wherein the breakaway component is configured to decouple from the vertical indicator responsive to movement of the lift mechanism to the lifting position and engagement of the lift mechanism with a payload; and wherein the breakaway component is configured to couple with the vertical indicator responsive to movement of the lift mechanism to the retracted position and disengagement of the lift mechanism from the payload.

15. The apparatus of claim 7, wherein the vertical indicator further comprises at least one of a movable element, a visual emitter, or an audio emitter;

wherein at least one of the movable element, the visual emitter, or the audio emitter is activated to communicate at least one attribute associated with the apparatus; and wherein the at least one attribute comprises at least one of a size, position, orientation, direction of motion, intent, task, destination, or operational status.

16. A method, comprising:

causing, by a controller, movement of a lift mechanism of an autonomous mobile robot between a retracted position and a lifting position; and causing movement of a vertical height extension of the autonomous mobile robot between a lowered position and a raised position;

wherein the movement of the vertical height extension between the lowered position and the raised position is caused by the movement of the lift mechanism between the retracted position and the lifting position; and wherein in the raised position, the vertical height extension increases a vertical height and visibility of the autonomous mobile robot.

17. The method of claim 16, further comprising:

causing, by the controller via a drive mechanism, movement of the autonomous mobile robot under a payload;

wherein in the raised position, a breakaway component of the vertical height extension causes decoupling of a vertical indicator of the vertical height extension from an extension mechanism of the vertical height extension responsive to presence of the payload over the autonomous mobile robot.

18. The method of claim 17, further comprising:

causing movement of the extension mechanism of the vertical height extension to the lowered position;

wherein in the lowered position, the breakaway component of the vertical height extension causes coupling of the vertical indicator of the vertical height extension with the extension mechanism of the vertical height extension.

* * * * *